United States Patent
Inoue et al.

[11] 3,923,393
[45] Dec. 2, 1975

[54] ELECTROPHOTOGRAPHIC COLOR COPYING APPARATUS OF THE COLOR RESOLVING TYPE

[75] Inventors: Shozo Inoue, Fussa; Hajime Katayama, Tokyo, both of Japan

[73] Assignee: Canon Kabushiki Kaisha, Tokyo, Japan

[22] Filed: Nov. 16, 1973

[21] Appl. No.: 416,453

[30] Foreign Application Priority Data
Nov. 24, 1972 Japan............................. 47-117784

[52] U.S. Cl. .......................... 355/35; 355/4; 355/71
[51] Int. Cl.²............................................. G03B 27/76
[58] Field of Search ............... 355/35, 36, 37, 71, 4; 354/45; 353/84, 97

[56] References Cited
UNITED STATES PATENTS

| | | |
|---|---|---|
| 3,002,425 | 10/1961 | Biedermann et al................... 355/36 |
| 3,260,152 | 7/1966 | Aston................................... 355/35 |
| 3,467,468 | 9/1969 | Johnson................................. 355/4 |
| 3,469,914 | 9/1969 | Thomson............................. 355/35 X |
| 3,602,579 | 8/1971 | Silvertooth......................... 355/36 X |
| 3,752,577 | 8/1973 | Grossetete et al...................... 355/36 |

*Primary Examiner*—Monroe H. Hayes
*Assistant Examiner*—Kenneth C. Hutchison
*Attorney, Agent, or Firm*—Fitzpatrick, Cella, Harper & Scinto

[57] ABSTRACT

In a color copying apparatus of the color resolving type for color-resolving a color original image into monochromatic optical images and projecting such optical images upon an exposure station, there are provided color resolving means having a predetermined number of color resolving filters for color-resolving the light projected from the original image through projection means, exposure regulating means disposed in the optical projection path of the projection means, and means for operating the exposure regulating means in response to each change-over between the filters of the colorr resolving means.

6 Claims, 7 Drawing Figures

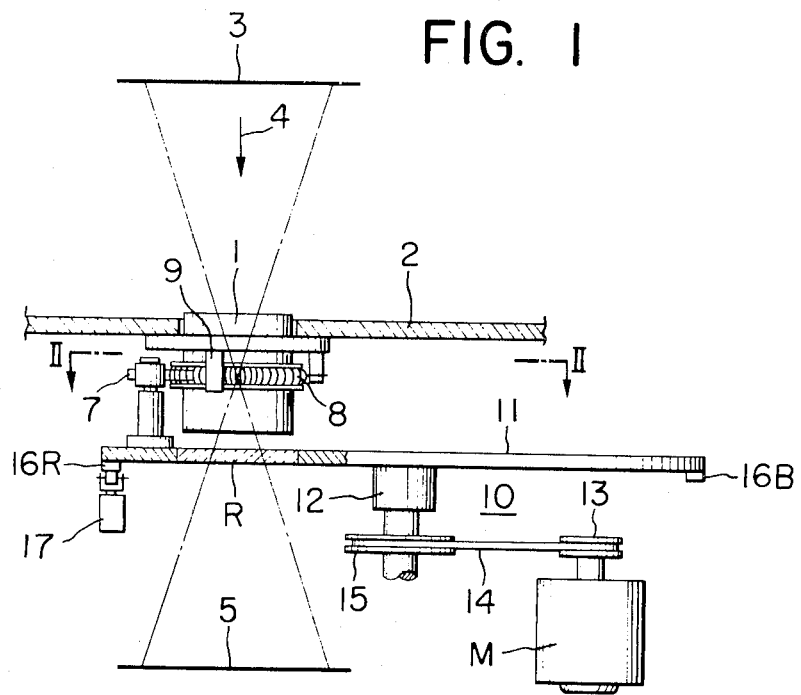
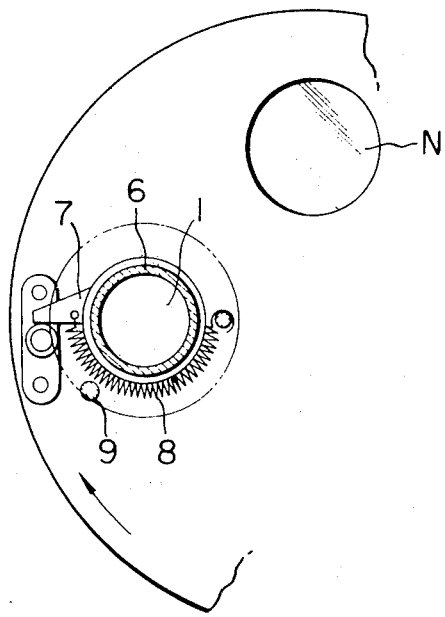
FIG. 1
FIG. 2
FIG. 4

ELECTROPHOTOGRAPHIC COLOR COPYING APPARATUS OF THE COLOR RESOLVING TYPE

BACKGROUND OF THE INVENTION

1. Field of the Invention

This invention relates to an electrophotographic color copying apparatus of the color resolving type, and more particularly to such a copying apparatus in which the amount of each resolved color light for exposure may be mechanically controllable to produce copies having a faithful color balance of an original image to be copied.

2. Description of the Prior Art

To obtain copies having a faithful color balance of an original image by using an electrophotographic color copying apparatus of the color resolving type, the exposures for the respective color resolution processes must be regulated by taking into account the differences between the light transmission factors of the various color resolving filters in use, the differences in the spectral sensitivities of the photosensitive medium in use, and the differences in the spectral distributions of the light source used for illuminating the original image.

For example, Table 1 below shows the average transmission factors of typical color resolving filters used with a three-color resolving system, and indicates that these transmission factors differ from one another.

Table 1.

| Color resolving filters | Average transmission factors |
| --- | --- |
| Wratten No. 25 Red-Filter | 90% for light of 600 m$\mu$ or more |
| " No. 58 Green-Filter | 40% for light of 500–600 m$\mu$ |
| " No. 47 Blue-Filter | 40% for light of 400–500 m$\mu$ |

Further, as can be seen in FIG. 7 of the drawings, a ZnO photosensitive medium sensitized by coloring matter exhibits non-uniform spectral sensitivities, that is, if the average sensitivity to the red range (600 m$\mu$ or more) is 1.0, the average sensitivities to the green range (500–600 m$\mu$) and the blue range (400–500 m$\mu$) are about 0.8 and about 0.5, respectively.

Therefore, if a color copy is to be produced through the three-color resolution process by using three color filters for the above-mentioned three colors, a ZnO photosensitive medium, and an illuminating light source whose spectral lights in the red, green and blue ranges are quantitatively at a ratio of 1 : 09 : 0.8, then the exposures during the respective color resolution processes must be regulated so as to provide a ratio of 1.0 for red, $$3.12 \left( \approx \frac{90\%}{40\%} \times \frac{1}{0.8} \times \frac{1}{0.9} \right)$$

for green and $$5 \left( = \frac{90\%}{40\%} \times \frac{1}{0.5} \times \frac{1}{0.8} \right)$$

for blue, otherwise the electrostatic latent image levels resulting from the respective processes would be irregular, thus failing to produce copies of faithful color balance. It should be noted, however, that the calculation of the exposures for the respective color resolution processes need not always be based on all of the differences between the light transmission factors of the various color resolving filters, the differences in the spectral sensitivities of the photosensitive medium, and the differences in the spectral distributions of the light source.

To achieve the aforesaid regulation of the color balance, a method has heretofore been proposed whereby the exposure time or the intensity of illumination may be varied between the respective processes. The method of varying the exposure time has required the exposure time to be varied between the various resolved colors which, in turn, has led to different lengths of process time required for the representation of the various colors, thus having complicated the construction of the apparatus. The method of varying the intensity of illumination has suffered from variations with time in the characteristic of the light source, which, in turn, has required the amount of light from the light source to be regulated at all times in order to ensure a faithful color balance, so that it has been difficult to completely maintain a color balance with a high fidelity.

SUMMARY OF THE INVENTION

The present invention provides, in an electrophotographic color copying apparauts of the color resolving type, color resolving means having a predetermined number of color resolving filters for color resolving the light projected from an original image through projection means onto an exposure station, and exposure regulating means disposed in the optical path of the projection means and operable in response to change-over between the color resolving filters to thereby provide a proper value of exposure.

An object of the present invention is to provide an electrophotographic color copying apparatus of the color resolving type which can automatically regulate the exposure during various color resolution processes by means of a simple mechanism.

Another object of the present invention is to provide an electrophotographic color copying apparatus of the described type which permits a simple construction for the exposure regulating mechanism.

Other objects and features of the present invention will become fully apparent from the following detailed description of various embodiments thereof taken in conjunction with the accompanying drawings.

BRIEF DESCRIPTION OF THE DRAWINGS

FIG. 1 schematically shows the exposure station in a copying apparatus according to an embodiment of the present invention.

FIG. 2 is a fragmentary bottom view of the lens aperture portion shown in FIG. 1.

FIG. 4 is a fragmentary view showing a modified form of the mechanism for actuating the lens aperture.

DESCRIPTION OF THE PREFERRED EMBODIMENTS

Figure 3:
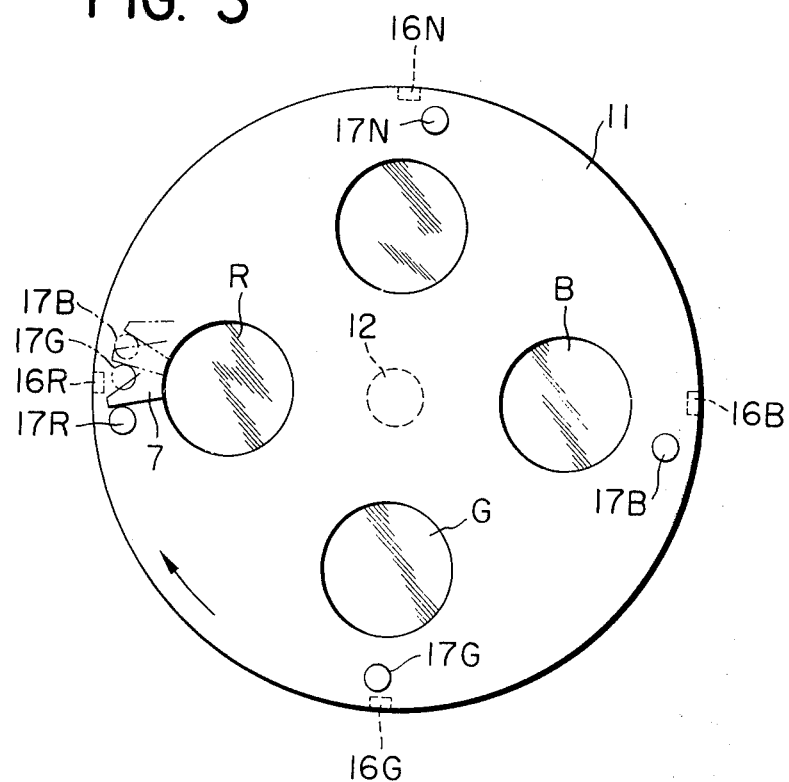
FIG. 3 is a plan view of a rotatable disc having color resolving filters mounted therein.

Referring to FIG. 1, an image forming lens 1 is securely mounted to a main body member 2 of a copying apparatus so that light 4 reflected from or transmitted through an original to be copied 3 may be passed through the lens 1 to a photosensitive medium 5 to form an image thereon. An aperture ring 6 is incorporated in the image forming lens 1 and may be maintained in a maximum open condition or in a maximum stopped-down condition by an actuating lever 7, which is normally biased by a spring 8 into engagement with a stop pin 9. A color resolving filter device 10 is provided to shiftably position each of color resolving filters in the optical path of the image forming lens 1. As is particularly shown in FIG. 3, the filter device 10 may comprise three color resolving filters, i.e. a red filter R, a green filter G and a blue filter B, and if required, a neutral filter N, these filters being mounted in a disc 11 rotatable about a shaft 12 and being disposed radially equidistantly from the shaft 12. The disc 11 may be rotatively driven from a motor M through a pulley-belt connection 13, 14, 15 and the shaft 12 so that the various filters R, G, B and N may successively traverse the optical path of the image forming lens 1. A drive disconnecting mechanism for disconnecting the drive from the motor M, comprising cams 16R, 16G, 16B, 16N and a microswitch 17, is provided to temporarily stop the disc 11 (until completion of exposure) when each of the various filters R, G, B and N comes to the position right beneath the image forming lens 1 during rotation of the disc 11.

Pins 17R, 17G, 17B and 17N are planted in the disc adjacent the filters R, G, B and N, respectively, so that when each of the filters has come to the position right beneath the lens 1 the associated one of the pins may engage with the aperture ring actuating lever 6 to actuate the lever into rotation against the force of the spring 8 to thereby stop down or open the aperture ring 6. The pins 17R, 17G, 17B and 17N are positioned in such a relationship with respect to the lever 7 that the aperture of the aperture ring attains a proper aperture value or proper exposure predetermined correlatively with each color resolution exposure process. Thus, each time the filter R, G, B or N comes to the position beneath the image forming lens 1, its associated pin 17R, 17G, 17B or 17N acts on the aperture ring actuating lever 7 to automatically set up the proper exposure value for a respective color resolution exposure process.

FIG. 4 fragmentarily shows an arrangement which employs cams 18R, 18G, 18B and 18N in lieu of the pins 17R, 17G, 17B and 17N, although only the cam 18R is shown there. By suitably selecting a height $h$ for each of these cams there may be provided the same function as that attained when the pins 17R, 17G, 17B and 17N have been employed.

Figure 5:
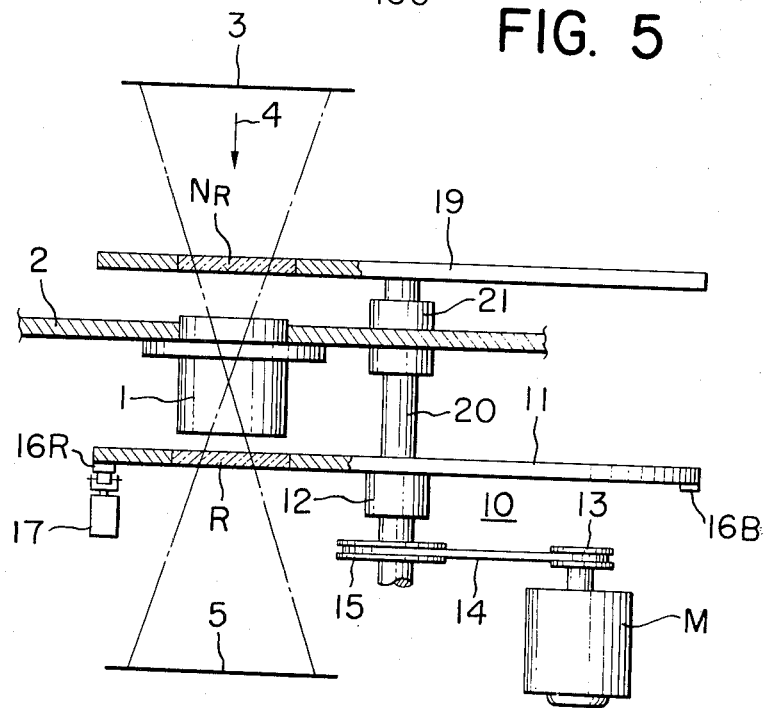
FIG. 5 shows the exposure station in another embodiment of the present invention.

FIG. 5 shows an alternative embodiment of the present invention in which an additional disc 19 is disposed parallel to the disc 11 of the color resolving filter device and securely carries thereon neutral filters $N_R$, $N_G$, $N_B$ and if required, $N_N$, for correcting the exposure in accordance with the respective color resolving filters. These neutral filters are disposed radially equidistantly from a rotatable shaft 20 connected to the shaft 12 of the disc 11 by means of a bearing member 21 mounted to the main body member 2 of the copying apparatus.

Figure 6:
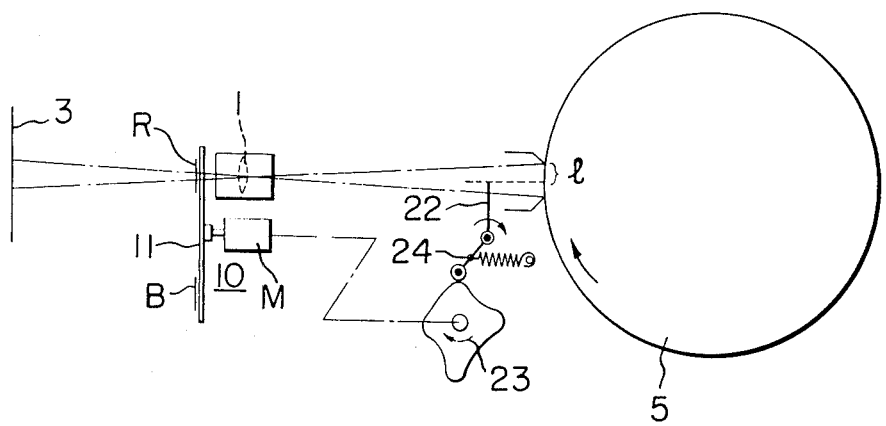
FIG. 6 schematically shows the exposure station in the copying apparatus of the slit exposure type according to a further embodiment of the present invention.
Figure 7:
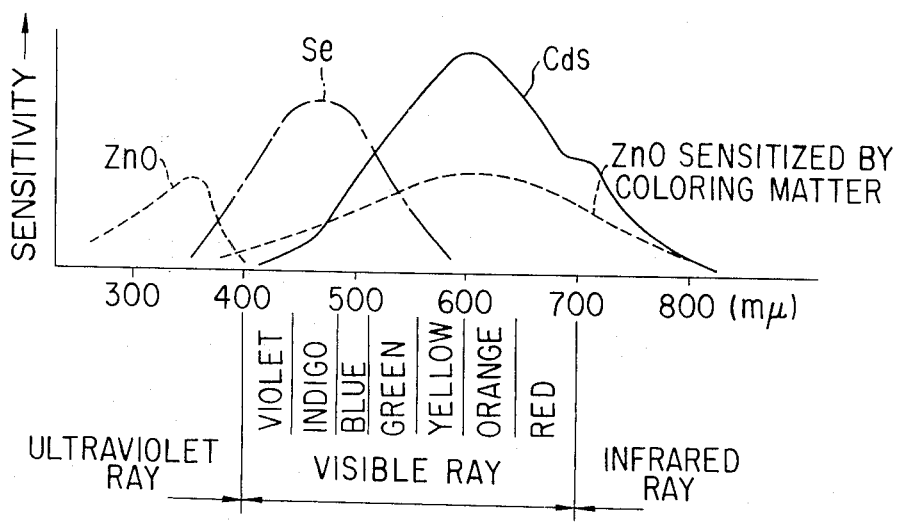
FIG. 7 is a graph illustrating the spectral sensitivity characteristics of various photosensitive mediums.

FIG. 6 shows a further embodiment of the present invention which is of the slit exposure type and in which a slit width control plate 22 is moved by a cam 23, which is operatively connected to a color resolving filter device 10, through the agency of a lever 24, to vary the slit width $l$ to thereby regulate the exposures for the respective color resolution processes. The configuration of the cam 23 may be designed by calculating from the proper exposure for the respective processes.

The present invention, as will be appreciated from the above-described embodiments, provides an electrophotographic color copying apparatus of the color resolving type which is highly effective and can automatically regulates the exposures for the respective color resolution processes by a simple mechanism.

We claim:

1. A color copying apparatus of the color resolving type for color-resolving a color original image into monochromatic optical images and projecting such optical images upon an exposure station for exposure, said apparatus comprising:

projecting means for projecting therethrough the original image upon the exposure station;

color resolving means having a predetermined number of color resolving filters for color-resolving the light projected through said projection means, said filters being selectively positionable in the optical projection path of said projection means;

exposure regulating means provided in the optical projection path of said projection means and having an adjustable aperture mechanism and a member for setting the aperture-opening of said mechanism; and means for operating said exposure regulating means having a plurality of members for adjusting said setting member, each of which is associated with a different filter and is mechanically coupled to said setting member in response to the setting of the corresponding filter of said color resolving means in said optical projection path to adjust the aperture mechanism to an aperture-opening corresponding to the predetermined exposure needed for that color.

2. A color copying apparatus according to claim 1, wherein said projection means comprises a lens barrel including an image forming lens system, and said exposure regulating means comprises an aperture mechanism provided on said lens barrel.

3. A color copying apparatus according to claim 2, wherein said aperture mechanism has an aperture opening-closing lever normally engaged by a member imparting a uni-directional bias force.

4. A color copying apparatus according to claim 3, wherein said color resolving filters of said color resolving means are disposed in a rotatable plate radially equidistantly from the axis of said plate, and includes means for positioning each of said color resolving filters in the optical projection path of said projection means in turn.

5. A color copying apparatus according to claim 4, wherein said positioning means includes positioning signal generating means provided on said rotatable plate and positioning signal detecting means provided adjacent to said rotatable plate.

6. A color copying apparatus according to claim 4, wherein said means for operating said exposure regulating means includes projecting members provided on said rotatable plate and engageable with said aperture opening-closing lever upon stoppage of said rotatable plate.

* * * * *